United States Patent
Sacha et al.

(10) Patent No.: US 10,154,512 B2
(45) Date of Patent: Dec. 11, 2018

(54) SYSTEM AND METHODS FOR MAC LAYER SCHEDULING IN WIRELESS COMMUNICATION NETWORKS

(71) Applicant: Alcatel-Lucent USA Inc., Murray Hill, NJ (US)

(72) Inventors: Jan Sacha, Mountain View, CA (US); Fabio Pianese, Brussels (BE)

(73) Assignees: Alcatel Lucent, Billancourt (FR); Nokia of America Corporation, Murray Hill, NJ (US)

( * ) Notice: Subject to any disclaimer, the term of this patent is extended or adjusted under 35 U.S.C. 154(b) by 174 days.

(21) Appl. No.: 15/179,187

(22) Filed: Jun. 10, 2016

(65) Prior Publication Data

US 2017/0359833 A1    Dec. 14, 2017

(51) Int. Cl.
*H04W 72/12* (2009.01)
*H04L 5/00* (2006.01)

(52) U.S. Cl.
CPC ....... *H04W 72/1247* (2013.01); *H04L 5/0037* (2013.01)

(58) Field of Classification Search
CPC .............. H04L 5/0037; H04W 72/042; H04W 72/0446; H04W 72/10; H04W 72/1247
See application file for complete search history.

(56) References Cited

U.S. PATENT DOCUMENTS

| | | | |
|---|---|---|---|
| 9,706,558 B2 * | 7/2017 | Lioulis | H04W 72/082 |
| 2015/0141030 A1 * | 5/2015 | Basu-Mallick | H04W 28/0289 455/452.1 |
| 2015/0163822 A1 * | 6/2015 | Guo | H04W 72/121 370/329 |
| 2016/0021676 A1 * | 1/2016 | Yamazaki | H04W 72/10 370/329 |
| 2016/0080920 A1 * | 3/2016 | Baghel | H04L 67/1044 455/404.1 |
| 2017/0303291 A1 * | 10/2017 | Chae | H04W 72/10 |

* cited by examiner

*Primary Examiner* — Jamal Javaid
*Assistant Examiner* — Rosene Clark
(74) *Attorney, Agent, or Firm* — Harness, Dickey & Pierce, P.L.C.

(57) ABSTRACT

In one example embodiment, a network control node includes a memory having computer-readable instruction stored therein, and a processor. The processor configured to execute the computer-readable instructions to identify a plurality of schedulable user equipment (UE), each of the plurality of schedulable UEs having a corresponding priority value, determine whether to compute a new priority value for each of the plurality of schedulable UEs, assign a resource block to one of the plurality of schedulable user equipment based on the determining, and inform the one of the plurality of schedulable user equipment of the assigned resource block, to be used for data transmission.

10 Claims, 5 Drawing Sheets

SYSTEM AND METHODS FOR MAC LAYER SCHEDULING IN WIRELESS COMMUNICATION NETWORKS

BACKGROUND

In a wireless communication network such as a Long-Term Evolution (LTE) network, designing and implementing a MAC layer scheduler for an LTE base station (e.g., an evolved NodeB (e-NodeB)) is difficult because the scheduler has to solve a complex optimization problem in a tight time budget when determining to which user equipment (UE) to assign various available resource blocks. The scheduler solves such a complex optimization problem at each subframe, defined in LTE as a one-millisecond interval. In addition to scheduling, the scheduler performs a few additional tasks, such as static and semi-static channel scheduling, and HARQ retransmissions.

Commonly, a scheduler of an eNodeB allocates frequencies to a UE served by the eNodeB in groups of 12 subcarriers per subframe. Each group of 12 subcarriers is referred to as a resource block (RB). A mapping from resource blocks to users may be referred to as a schedule.

Currently utilized schedulers determine user priority metrics (e.g., values) for each schedulable (available) UE and group of RBs to discover optimal schedules. Given that computational resources (hardware) and time per subframe are fixed, the currently used approach faces a limit on the maximum number of UEs that an eNodeB scheduler can handle. Furthermore, currently utilized schedulers determine, from scratch, the user priority metrics at each subframe, which is system resource and power intensive.

SUMMARY

In one example embodiment, a network control node includes a memory having computer-readable instruction stored therein, and a processor. The processor is configured to execute the computer-readable instructions to identify a plurality of schedulable user equipment (UE), each of the plurality of schedulable UEs having a corresponding priority value, determine whether to compute a new priority value for each of the plurality of schedulable UEs, assign a resource block to one of the plurality of schedulable user equipment based on the determining, and inform the one of the plurality of schedulable user equipment of the assigned resource block, to be used for data transmission.

In yet another example embodiment, upon determining not to compute a new priority value for each of the plurality of schedulable UEs, the processor is configured to execute the computer-readable instructions to assign the resource block to a first one of the plurality of schedulable UEs having a highest corresponding priority value among the plurality of schedulable UEs.

In yet another example embodiment, upon determining to compute a new priority value for each of the plurality of schedulable UEs, the processor is configured to execute the computer-readable instructions to determine a new priority value for each of the plurality of schedulable UEs, and assign the resource block to the one of the plurality of schedulable UEs having the highest new priority value among the plurality of schedulable UEs.

In yet another example embodiment, the processor is configured to execute the computer-readable instructions to update a designation of the first one of the plurality of UEs to correspond to the schedulable UE having the highest new priority value, and store the new priority values in the memory.

In yet another example embodiment, the processor is configured to execute the computer-readable instructions to determine a first expected change in the corresponding priority value of a first one of the plurality of schedulable UEs having the highest priority value among the plurality of schedulable UEs, determine a second expected change in the corresponding priority value of a second one the plurality of schedulable UEs having a next highest priority value among the plurality of schedulable UEs, update the corresponding priority values of the first one and the second one of the plurality of schedulable UEs, and determine to compute a new priority value for each of the plurality of schedulable UEs based on the updated priority values of the first one and the second one of the plurality of schedulable UEs.

In yet another example embodiment, the processor is configured to execute the computer readable instructions to compare the priority value of the first one of the plurality of schedulable UEs and the updated priority value of the second one of the plurality of schedulable UEs, determine to compute the new priority value for each of the plurality of schedulable UEs if the processor determines the updated priority value of the second one of the plurality of schedulable UEs is less than the updated priority value of the first one of the plurality of schedulable UEs, and determine not to compute the new priority value for each of the plurality of schedulable UEs if the processor determines the updated priority value of the second one of the plurality of schedulable UEs is equal to or greater than the updated priority value of the first one of the plurality of schedulable UEs.

In yet another example embodiment, the processor is configured to execute the computer-readable instructions to, identify a plurality of resource blocks including the resource block, partition the plurality of resource blocks into a first group and a second group, determine to compute a new priority value for each of the plurality of schedulable UEs in association with each of the plurality of resource blocks in the first group, and determine not to compute a new priority value for each of the plurality of schedulable UEs in association with each of the plurality of resource blocks in the second group.

In yet another example embodiment, the processor is configured to execute the computer readable instructions to, for each of the plurality of resource blocks, determine a first schedulable UE having a highest corresponding priority value and a second schedulable UE having a next highest corresponding priority value among the schedulable UEs, for each of the plurality of resource blocks, determine a difference between the highest priority value and the next highest priority value, sort the plurality of resource blocks in an increasing order based on the determined differences, and partition the sorted plurality of resource blocks into the first group and the second group, using a threshold.

In yet another example embodiment, for each resource block in the second group, the processor is configured to execute the computer-readable instructions to assign the resource block to a first one of the plurality of schedulable UEs having a highest corresponding priority value among the plurality of schedulable UEs.

In yet another example embodiment, for each resource block in the first group, the processor is configured to execute the computer-readable instructions to determine the new priority value for each of the plurality of schedulable UEs, and assign the resource block to the one of the plurality of schedulable UEs having the highest new priority value among the plurality of schedulable UEs.

In one example embodiment, a method includes identifying a plurality of schedulable user equipment (UE), each of the plurality of schedulable UEs having a corresponding priority value, determining whether to compute a new priority value for each of the plurality of schedulable UEs, assigning a resource block to one of the plurality of schedulable user equipment based on the determining and informing the one of the plurality of schedulable user equipment of the assigned resource block, to be used for data transmission.

In yet another example embodiment, upon determining not to compute a new priority value for each of the plurality of schedulable UEs, the assigning assigns the resource block to a first one of the plurality of schedulable UEs having a highest corresponding priority value among the plurality of schedulable UEs.

In yet another example embodiment, upon determining to compute a new priority value for each of the plurality of schedulable UEs, the method further includes determining a new priority value for each of the plurality of schedulable UEs, wherein the assigning assigns the resource block to the one of the plurality of schedulable UEs having the highest new priority value among the plurality of schedulable UEs.

In yet another example embodiment, the method further includes updating a designation of the first one of the plurality of UEs to correspond to the schedulable UE having the highest new priority value and storing the new priority values in the memory.

In yet another example embodiment, the method further includes determining a first expected change in the corresponding priority value of a first one of the plurality of schedulable UEs, having the highest priority value among the plurality of schedulable UEs, determining a second expected change in the corresponding priority value of a second one the plurality of schedulable UEs having a next highest priority value among the plurality of schedulable UEs, updating the corresponding priority values of the first one and the second one of the plurality of schedulable UEs, and determining to compute a new priority value for each of the plurality of schedulable UEs based on the updated priority values of the first one and the second one of the plurality of schedulable UEs.

In yet another example embodiment, comparing the priority value of the first one of the plurality of schedulable UEs and the updated priority value of the second one of the plurality of schedulable UEs, determining to compute the new priority value for each of the plurality of schedulable UEs if the processor determines the updated priority value of the second one of the plurality of schedulable UEs is less than the updated priority value of the first one of the plurality of schedulable UEs, and determining not to compute the new priority value for each of the plurality of schedulable UEs if the processor determines the updated priority value of the second one of the plurality of schedulable UEs is equal to or greater than the updated priority value of the first one of the plurality of schedulable UEs.

In yet another example embodiment, the method further includes identifying a plurality of resource blocks including the resource block, partitioning the plurality of resource blocks into a first group and a second group, determining to compute a new priority value for each of the plurality of schedulable UEs in association with each of the plurality of resource blocks in the first group, and determining not to compute a new priority value for each of the plurality of schedulable UEs in association with each of the plurality of resource blocks in the second group.

In yet another example embodiment, the method further includes, for each of the plurality of resource blocks, determining a first schedulable UE having a highest corresponding priority value and a second schedulable UE having a next highest corresponding priority value among the schedulable UEs, for each of the plurality of resource blocks, determining a difference between the highest priority value and the next highest priority value, sorting the plurality of resource blocks in an increasing order based on the determined differences, and partitioning the sorted plurality of resource blocks into the first group and the second group, using a threshold.

In yet another example embodiment, for each resource block in the second group, the assigning assigns the resource block to a first one of the plurality of schedulable UEs having a highest corresponding priority value among the plurality of schedulable UEs.

In yet another example embodiment, for each resource block in the first group, the method further includes determining the new priority value for each of the plurality of schedulable UEs, and assigning the resource block to the one of the plurality of schedulable UEs having the highest new priority value among the plurality of schedulable UEs.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
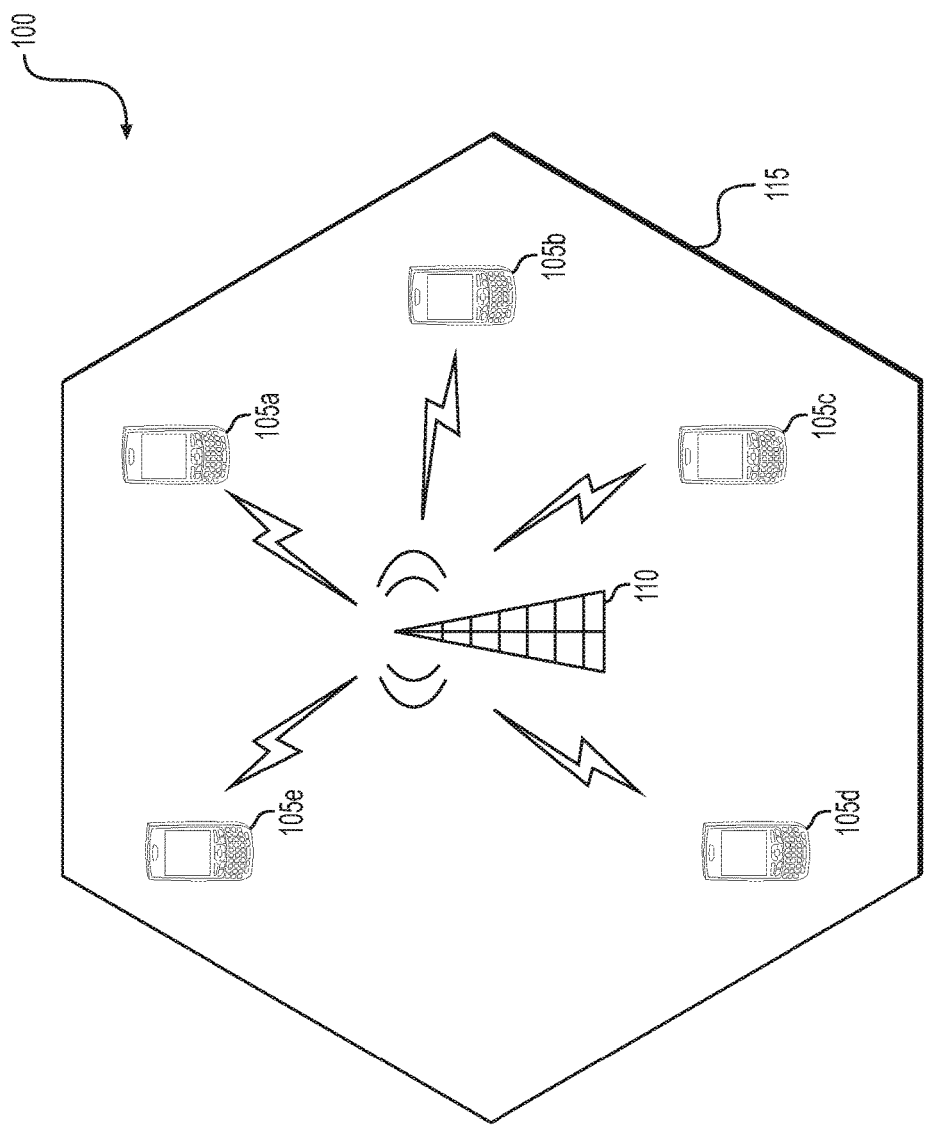
FIG. 1 illustrates a wireless communication system, according to an example embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Specific details are provided in the following description to provide a thorough understanding of example embodiments. However, it will be understood by one of ordinary skill in the art that example embodiments may be practiced without these specific detail. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with Radio Access Networks (RANs) such as: Universal Mobile Telecommunications System (UMTS); Global System; for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (Wi-MAX); Ultra Mobile Broadband (UMB); and $3^{rd}$ Generation Partnership Project LTE (3GPP LTE).

FIG. 1 illustrates a wireless communication system, according to an example embodiment. As shown in FIG. 1, a communication system 100 includes one or more user equipment (UEs) 105a-e serviced by a base station (BS) 110. In one example embodiment, the communication system 100 is an LTE-based communication system. Therefore, the BS 110 is an eNodeB. Hereinafter and for purposes of discussion the BS 110 may also be referred to as the eNodeB 110.

While the communication system 100 of FIG. 1 illustrates five UEs 105a-e and one eNodeB 110, example embodiments are not limited thereto and the communication system 100 may include any number of UEs and any number of eNodeBs. The eNodeB 110 may serve the geographical cell area 115. The UEs 105a-e may move from one cell to another and thus may be served by an eNodeB that is different from the eNodeB 110 depending on the location of the UEs 105a-e. While, example embodiments will be described hereinafter with reference to an LTE network, those having ordinary skill in the art realize that example embodiments are not limited to LTE based communication systems only.

In one example embodiment, the UEs 105a-e may be any known, or to be developed, mobile/cellular phones but example embodiments are not limited thereto. For example, any one of the UEs 105a-e may instead be a tablet, a laptop or any other Internet of Things device capable of establishing communication with the eNodeB 110.

While the communication system 100 of FIG. 1 is shown with the UEs 105a-e and the eNodeB 110, the communication system 100 may have other components (e.g., a mobility management entity, a packet gateway, etc.) that are known to those having ordinary skill in the art and that are necessary for the proper operation of the communication system 100.

Figure 2:
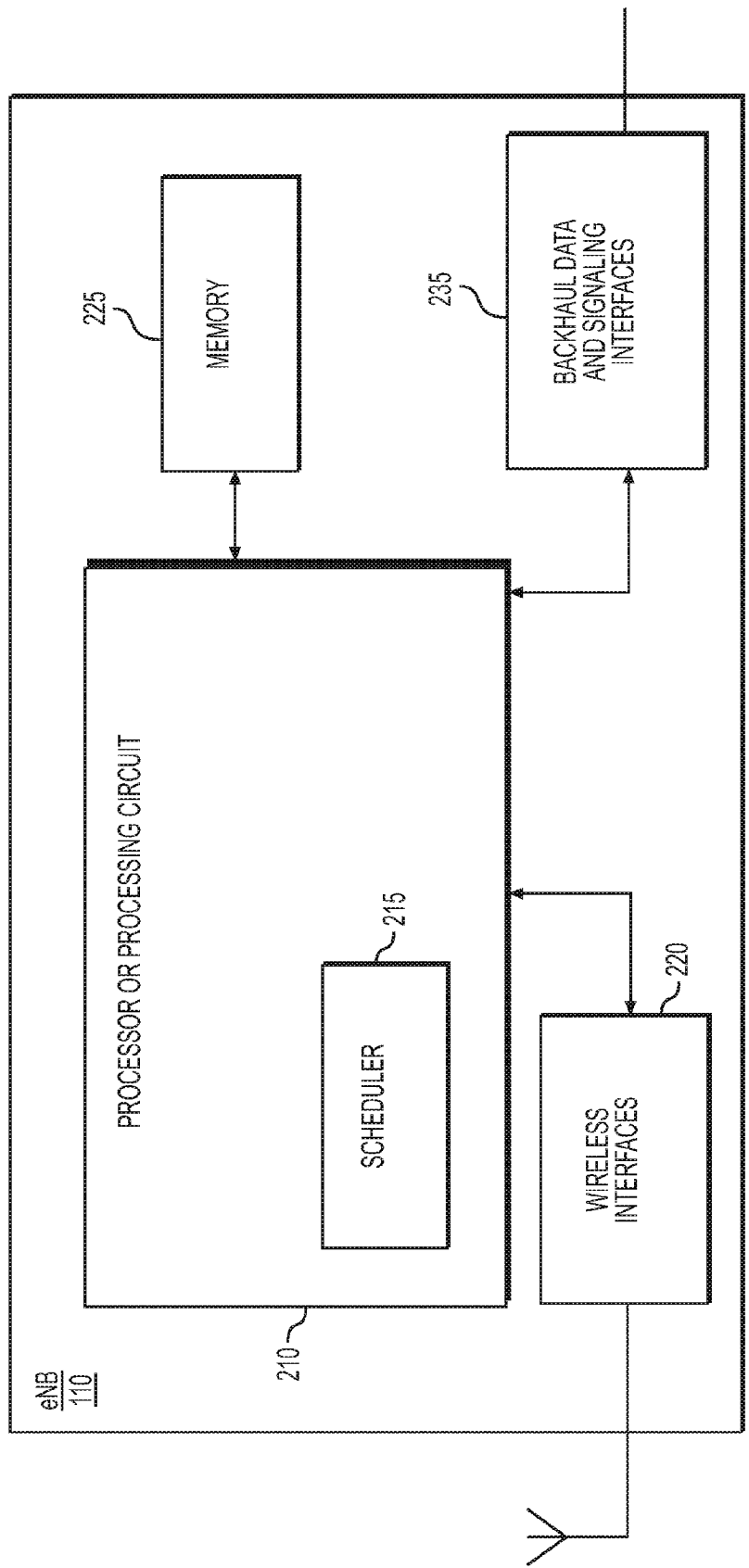
FIG. 2 illustrates an eNodeB of FIG. 1, according to an example embodiment.

FIG. 2 illustrates an eNodeB of FIG. 1, according to an example embodiment. Referring to FIG. 2, the eNodeB 110 includes: a memory 225; a processor 210; wireless communication interfaces 220; and a backhaul data and signaling interfaces (referred to herein as backhaul interface) 235. The processor or processing circuit 210 controls the function of eNodeB 110 (as described herein), and is operatively coupled to the memory 225 and the communication interfaces 220. While only one processor 210 is shown in FIG. 2, it should be understood that multiple processors may be included in a typical eNodeB, such as the eNodeB 110. The functions performed by the processor may be implemented using hardware. As discussed above, such hardware may include one or more Central Processing Units (CPUs), digital signal processors (DSPs), application-specific-integrated-circuits, field programmable gate arrays (FPGAs) computers or the like. The term processor or processing circuit, used throughout this document, may refer to any of these example implementations, though the term not limited to these examples. In one example embodiment, the processor 210 is configured to execute a set of computer-readable instructions stored on the memory 225, thus transforming the processor 210 into a special purpose processor for performing functionalities that will be described below. For example, as part of the functionalities implemented by this special purpose processor, the processor 210 may be configured to implement the functionalities of the scheduler 215 shown in FIG. 2.

Still referring to FIG. 2, the wireless communication interfaces 220 (also referred to as communication interfaces 220) include various interfaces including one or more transmitters/receivers (or transceivers) connected to one or more antennas to wirelessly transmit/receive control and data signals to/from the UEs 105a-e, or via a control plane.

The backhaul interface 235 interfaces with other components of the wireless communication system 100 (not shown) such as, but not limited to, a packet gateway, a mobility management entity, other eNodeBs, Evolved Packet Core network elements and/or other radio access network elements within the communication system 100.

The memory 225 may buffer and store data that is being processed at eNodeB 110, transmitted and received to and from the eNodeB 110. The memory 225 may also store the computer-readable instructions to be executed by the processor 210 for performing the following functionalities, as described above.

Still referring to FIG. 2, by implementing the functionalities of the scheduler 215, the processor 210 schedules control and data communications that are to be transmitted and received by the eNodeB 110 to and from one or more of the UEs 105a-e.

In an LTE based communication system such as the system 100 of FIG. 1, the eNodeB 110 assigns available resource blocks (RBs) to schedulable UEs (e.g. one or more of the UEs 105a-e of FIG. 1 that transmit data on an uplink and/or downlink channel to and from the eNodeB 110). In one example embodiment, each available RB is assigned to one schedulable UE and the schedulable UE to which an available RB is assigned, uses the assigned RB to transmit data to and from the eNodeB 110. The process of assigning available RBs to schedulable UEs may be referred to as a scheduling algorithm, which in one example embodiment is performed by the eNodeB 110.

The currently utilized scheduling algorithms are typically based on what is referred to as a "proportional-fair" algorithm, which aims at balancing the goals of maximizing the total throughput in the network and allocating the same (fair) share of the total throughput to each UE. According to currently utilized scheduling algorithms, at every subframe, a priority metric (value) is determined by a serving eNodeB for every schedulable UE. Thereafter, each available resource block in a subframe is assigned to a UE having the highest priority metric. Accordingly, at each subframe, the eNodeB determines a priority metric for every schedulable UE and every available RB.

Example embodiments described hereinafter are directed to an improved scheduling algorithm for assigning available resource blocks for transmission of data between a UE and a serving eNodeB. The improved scheduling algorithm is based on the idea that a priority metric of a user equipment is unlikely to change significantly on a millisecond scale from one subframe to another. In other words, a priority metric of a user equipment is relatively stable from one subframe to another except, for example, for circumstances in which a UE is a fast moving UE.

Accordingly, because a priority metric of a UE is relatively stable on a millisecond scale, the same priority metric may be used thus enabling the processor of an eNodeB to save computational resources, use less power, service more user equipment as well as allow for less expensive hardware to be used as a processor inside the eNodeB.

In other words, improved algorithms of example embodiments described herein, enable the eNodeB 110 to first determine whether new priority metrics should be computed for schedulable UEs and a given resource block or whether a previous schedule (from a previous subframe) for the given resource block can be reused thus saving system resources and increasing the number of UEs to which available resource blocks may be assigned.

Figure 3:
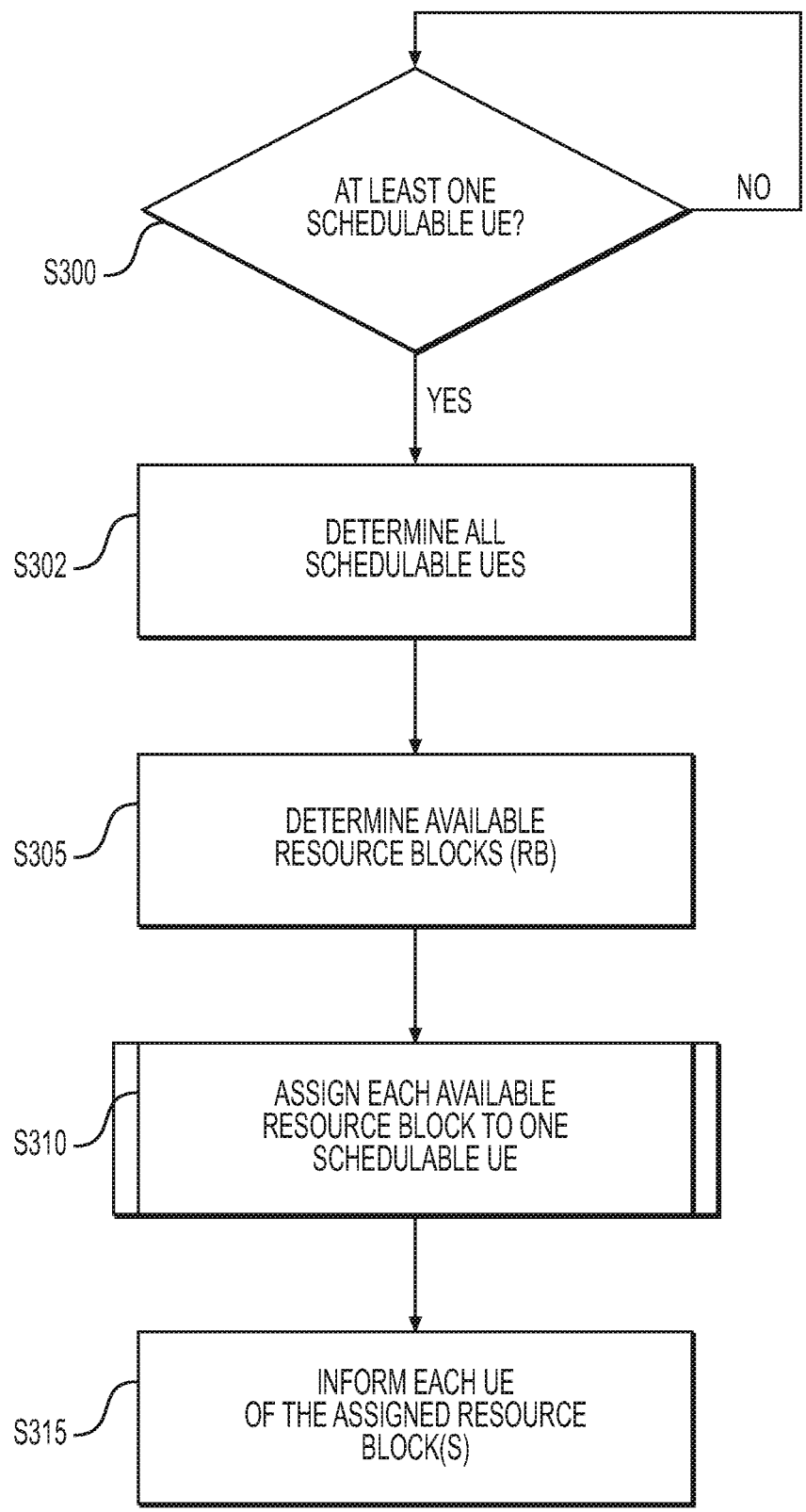
FIG. 3 describes a process of implementing a scheduling algorithm for assigning resource blocks to user equipment, according to an example embodiment.

FIG. 3 describes a process of implementing a scheduling algorithm for assigning resource blocks to user equipment, according to an example embodiment. FIG. 3 will be described with reference to the eNodeB 110 and the UEs 105a-e. While FIG. 3 will be described with reference to the eNodeB 110, it will be understood that the described functionalities will be implemented by the processor 210 of the eNodeB 110 shown in FIG. 2, where the processors 210 executes the computer-readable instructions corresponding to the scheduler 215 (which may be saved and retrieved from the memory 225).

At S300, the eNodeB 110 determines whether there is at least one schedulable UE (e.g., from among UEs 105 a-e of FIG. 1). If at S300, the eNodeB 110 determines that there are no schedulable UEs, the eNodeB 110 may repeat S300 periodically until at least one schedulable UE is identified by the eNodeB 110. The periodicity with which the eNodeB 110 may repeat S300 may be an adjustable parameter determined based on experiments and/or empirical studies.

If at S300, the eNodeB 110 determines that there is at least one schedulable UE, then at S302, the eNodeB 110 determines (identifies) all schedulable UEs (the number of schedulable UEs from among UEs 150 a-e). In one example embodiment, a UE is schedulable if the UE transmits and/or receives data on one of an uplink (UL) or a downlink (DL) channel. While the eNodeB 110 may determine the number of schedulable UEs from among UEs 105 a-e based on data transmission/reception on one of the UL or the DL channels, example embodiments for determining the number of schedulable UEs is not limited thereto. Any other known, or to be developed, method of determining the number of schedulable UEs may be utilized.

At S305, the eNodeB 110 determines (identifies) available resource blocks (RBs) that are assignable to one of the schedulable UEs. In one example embodiment, the eNodeB 110 determines a RB to be available if the RB is not currently assigned to any of the UEs 105 a-e.

At S310, the eNodeB 110 assigns each available RB to one of the schedulable UEs identified at S302. In one example embodiment, the eNodeB 110 assigns each available RB to one of the schedulable UEs based on at least one of a previous schedule used for each available RB in a previous subframe or a new schedule for each available RB (e.g., based on new priority metrics computed for schedulable UEs and each available RB). S310 will be further described with reference to FIGS. 4 and 5.

At S315, the eNodeB 110 informs (communicates with) each UE from among the UEs 105 a-e to which a RB is assigned, in order to inform the corresponding UE that the UE is to use the frequencies in the assigned RB for UL and/or DL data transmission.

Figure 4:
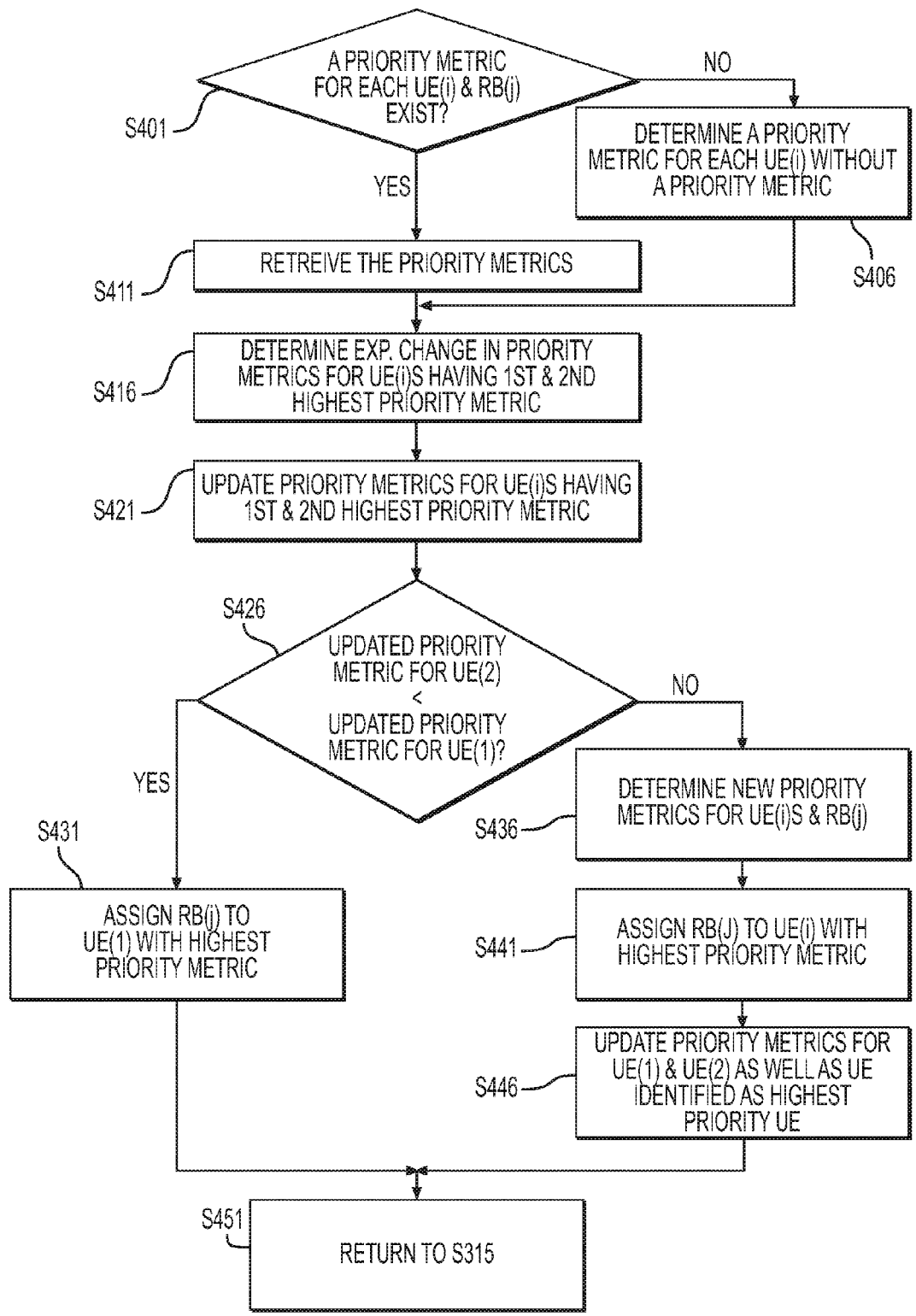
FIG. 4 describes a process for assigning available RBs to schedulable users, according to an example embodiment.

FIG. 4 describes a process for assigning available RBs to schedulable users, according to an example embodiment. With reference to FIG. 4, each schedulable UE determined at S302 will be referred to as UE(i), where i=1, . . . , n, where n is the maximum number of schedulable UEs determined at S302, which may or may not be equal to the maximum number of UEs served by a serving eNodeB. For example, according to FIG. 1, the maximum value of n is 5.

Furthermore, each available RB determined at S305 will be referred to as RB(j), where j=1, . . . m, where m is the maximum number of available RBs.

At S401, for $RB_j$, the eNodeB 110 determines whether a priority metric (value) for each schedulable UE(i) exists. In one example embodiment, a UE(i) does not have an associated priority metric if the UE(i) is identified by the eNodeB 110 as being schedulable for the first time. In one example embodiment, any priority metric previously determined for any combination of UE(i) and each RB(j) is saved, in a tabular form, on the memory 225 of the eNode B 110. Accordingly, the eNodeB 110 determines the existence of a prior priority metric for each UE(i) by searching the table saved on the memory 225.

If at S401, the eNodeB 110 determines that a priority metric for one or more schedulable UE(i) does not exist, at S406, the eNodeB 110 determines a priority metric for the one or more schedulable UE(i) that do not have an associated priority metric. In one example embodiment, the eNodeB 110 determines a priority metric for UE(i) and RB(j), according to the following formula:

$$M_j(i) = \lambda_i w_i r_i(j)/(R_i)^\alpha \qquad (1)$$

where $r_i(j)$ is the spectral efficiency for UE(i) on the RB(j) estimated using, for example, narrowband channel quality indications (CQIs), $R_i$ is the average data transmission rate achieved by UE(i) in the most recent time window, α is a fairness factor which may be determined based on experiments, field tests and/or empirical studies, $w_i$ is an adaptive weight based on a discrepancy between achieved bitrate for communication between the UE(i) and the eNodeB 110, guaranteed bitrate (GBR), and maximum bitrate (MBR) of UE(i), and $\lambda_i$ is a grade of service (GoS) factor for UE(i).

The various variables utilized in equation (1) as described above, may be determined based on any known, or to be developed, method(s).

As mentioned above, on a millisecond scale (from one millisecond to the next), a UE(i)'s priority metric is relatively stable. The UE(i)'s priority metric is relatively stable because all of the elements of equation (1) are relatively stable on a millisecond scale (except for a fast moving UE(i), for example.) In one example embodiment, $r_i(j)$ is based on periodic CQI reports and except for fast-moving UEs is unlikely to change in one millisecond. $R_i$ is a moving average of the data transmission rate achieved over multiple subframes, α is a constant, $w_i$ is gradually updated based on the average achieved bitrate, and $\lambda_i$ is constant. Therefore, a UE(i)'s priority metric is relatively stable.

Accordingly and in one example embodiment, when a UE(i) has by fax the highest priority metric for a certain RB(j) in a current subframe, it is more likely than not, that the UE(i) will keep the highest priority metric in the next subframe for the certain RB(j) as well. Accordingly, the eNodeB 110 may reassign the RB(j) to the UE(i) in the next subframe without having to determine the priority metric for the UE(i) for the next subframe.

However, if at S401, the eNodeB 110 determines that all UE(i)s have a priority metric (previously determined) for RB(j), the process proceeds to S411. At S411, the eNodeB 110 retrieves the priority metrics for UE(i)s from the memory 225. Thereafter the process proceeds to S416, which will be described below.

By performing the processes at S416, S421 and S426, each of which will be described in detail below, the eNodeB 110 determines whether a new priority metric should be computed for each schedulable UE(i) and a given RB(j). Thereafter and based on the result of such determination, the eNodeB 110 determines whether to utilize a previously used schedule or a new schedule for assigning the given RB(j) to one of the schedulable UE(i)s. This will be further described below.

At S416, the eNodeB 110 determines an expected change in a priority metric for the UE(i)s having the first and second highest priority metric for RB(j). In one example embodiment, the expected change is represented by the function $\Delta_i$ (which may also be referred to as a delta function). In one embodiment, the function $\Delta_1$ is a measure of the maximum expected change in the priority metric for UE(i) between two consecutive subframes. In one example embodiment, the eNodeB 110 determines the function $\Delta_1$ for the UE(i)s having the first and second highest priority metric, among the schedulable UEs, for the RB(j) based on previous priority metrics determined by the eNodeB 110 for each of the UE(i)s having the first and second highest priority metric for the RB(j).

In one example embodiment, the function $\Delta_i$ is represented as $\Delta_i(m)=\varepsilon m$, where $\varepsilon$ has a value greater than 0 and less than 1 and m is the priority metric for UE(i). In one example embodiment, the $\varepsilon$ parameter is configured based on system simulations and experiments with real-world deployments. For example, a low $\varepsilon$ value (e.g., $0<\varepsilon<0.5$) would represent an optimistic algorithm that reuses allocations (schedules) from previous subframes more often than not, thus saving computational resources, at a higher risk of producing suboptimal RB allocation/schedules. On the other hand, a high $\varepsilon$ (e.g., $0.5<\varepsilon<1$) allows a more conservative scheduling policy which result is less reuse of previous subframe allocations (schedules), with the advantage of achieving more robust and better RB allocation/scheduling result.

In one example embodiment, the function $\Delta_1$ may be a constant for all UE(i)s. In one example embodiment, the function $\Delta_i$ may be determined based on a UE(i)'s bandwidth allocation in addition to or in place of the above-described factors. The eNodeB 110 may know how much bandwidth the eNodeB 110 is allocating to each UE(i) in a given subframe.

At S421, the eNodeB 110 updates the priority metric for UE(i) having the first and second highest priority metric for RB(j) based on the corresponding one of the expected changes determined at S416. In one example embodiment, the eNodeB 110 updates the priority metric for the UE(i) having the highest priority metric for RB(j) (Hereinafter and for ease of discussion, the UE(i) having the highest priority metric is denoted as UE(1)), as follows:

$$M_j^1\_\text{updated}=M_j^1-\Delta_1(M_j^1) \quad (2)$$

where $M_j^1$_updated is the updated priority metric for UE(1) and RB(j), $M_j^1$ is the priority metric for UE(1) at RB(j) as determined at S406 or retrieved from the memory 225 at S411, as described above, and $\Delta_1$ is the expected change determined for the UE(1) having the highest priority metric at S416.

Similar to the UE(1) having the highest priority metric, at S421, the eNodeB 110 also updates the priority metric for the UE(i) having the second highest priority metric (Hereinafter and for ease of discussion, the UE(i) having the second highest priority metric is denoted as UE(2)). In one example embodiment, the eNodeB 110 updates the priority metric for UE(2), as follows:

$$M_j^2\_\text{updated}=M_j^2+\Delta_2(M_j^2) \quad (3)$$

where $M_j^2$_updated is the updated priority metric for UE(2) and RB(j), $M_j^2$ is the priority metric for UE(2) at RB(j) as determined at S406 or retrieved from the memory 225 at S411, as described above, and $\Delta_2$ is the expected change determined for the UE(2) having the second highest priority metric at S416.

Thereafter, at S426, the eNodeB 110 determines whether the $M_j^2$_updated determined according to equation (3) is less than $M_j^1$_updated determined according to equation (2).

If at S426, the eNodeB 110 determines that $M_j^2$_updated is less than $M_j^1$_updated, then at S431, the eNodeB 110 assigns RB(j) to UE(2). In other words, the eNodeB 110 does not determine a new priority metric for UE(1), which is the UE that had the highest priority metric in the previous subframe, and maintains the assignment of RB(i) to UE(1) (i.e., reuses a previous schedule for RB(j)).

However, if at S426, the eNodeB 110 determines that $M_j^2$_updated is equal to or greater than $M_j^1$_updated, then at S441, the eNodeB 110 determines new priority metrics (values) for all schedulable UE(i)s and the RB(j). In one example embodiment, the eNodeB 110 determines new values for all schedulable UE(i)s and RB(j) using equation (1).

Thereafter, at S441, the eNodeB 110 assigns RB(j) to one of the schedulable UE(i)s having the highest new priority metric.

Thereafter, at S446, the eNodeB 110 updates the values of $M_j^1$, $M_j^2$ and UE(i) determined to have the highest new priority metric (at S441). Thereafter, at S451, the process reverts back to S315 of FIG. 3.

It should be noted that the eNodeB 110 performs the process of FIG. 4 for each available RB(j) for j=1, . . . , m, as described above, where m is the maximum number of available RBs to be assigned to a schedulable UE.

Figure 5:
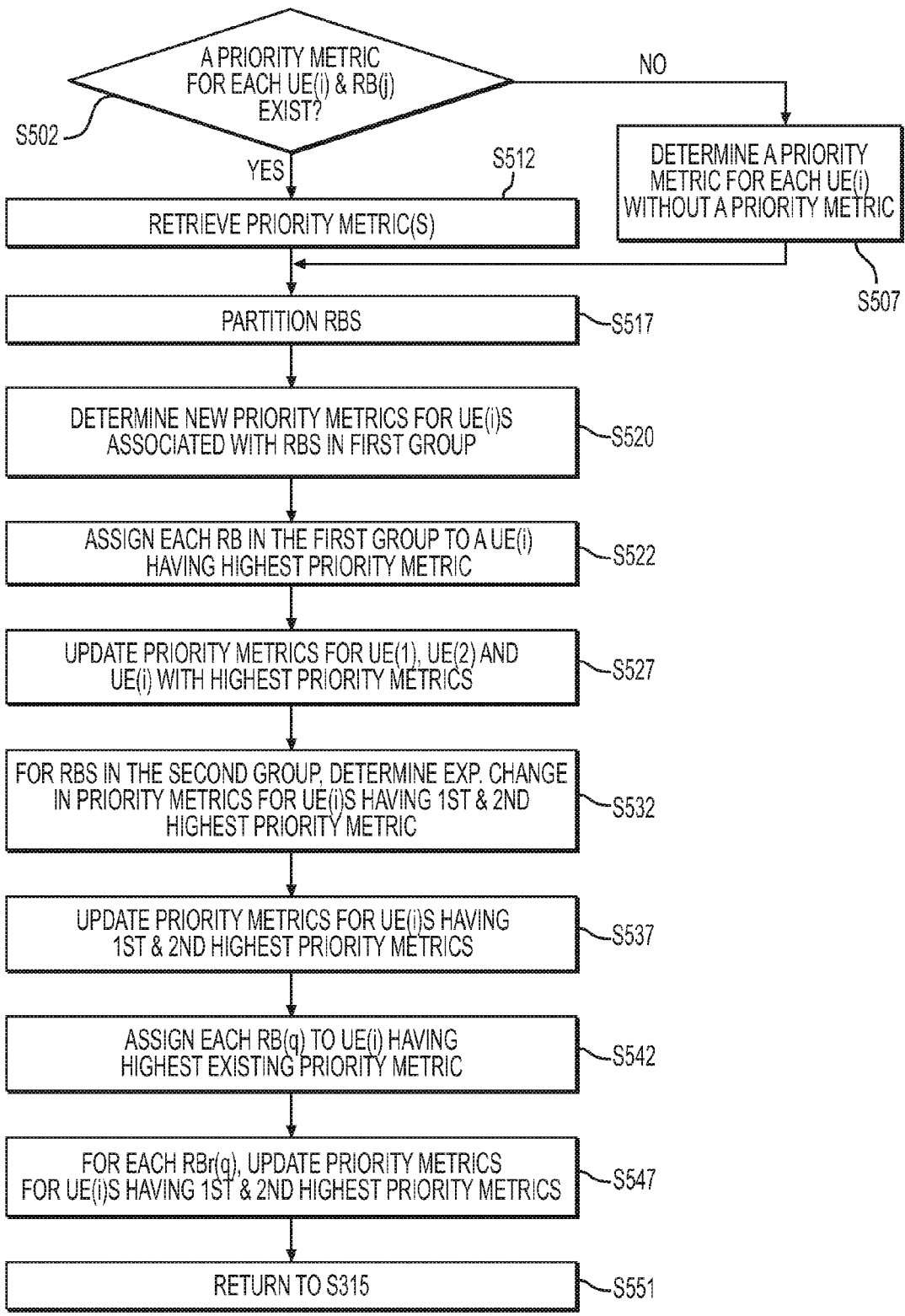
FIG. 5 describes a process for assigning available RBs to schedulable users, according to an example embodiment.

FIG. 5 describes a process for assigning available RBs to schedulable users, according to an example embodiment. With reference to FIG. 5, each schedulable UE determined at S302 will be referred to as UE(i), where i=1, . . . , n, where n is the maximum number of schedulable UEs determined at S302, which may or may not be equal to the maximum number of UEs served by a serving eNodeB. For example, according to FIG. 1, the maximum value of n is 5.

Furthermore, each available RB determined at S305 will be referred to as RB(j), where j=1, . . . m, where m is the maximum number of available RBs.

In FIG. 5, S502, S507 and S512 are the same as S401, S406 and S411, respectively, as described above with reference to FIG. 4. Accordingly and for sake of brevity, S502, S507 and S512 will not be further described.

In one example embodiment, by performing the processes at S517, S522, S532 and S537, each of which will be described in detail below, the eNodeB 110 determines whether a new priority metric should be computed for each schedulable UE(i) and a given RB(j). Thereafter and based on the result of such determination, the eNodeB 110 determines whether to utilize a previously used schedule or a new schedule for assigning the given RB(j) to one of the schedulable UE(i)s. This will be further described below.

At S517, the eNodeB 110 partitions the available RBs into a first group and a second group. In one example embodiment, the eNodeB 110 partitions the available RBs as follows. The eNodeB 110 sorts the available RBs in an increasing order based on a difference between the priority metrics of UE(i)s having the first and second highest priority metric for each available RB. In other words, for each available RB(j), the eNodeB 110 determines a difference between $M_j^1$ and $M_j^2$. Thereafter, the eNodeB 110 sorts the available RBs in an increasing order based on the determined differences. At this stage, the available RBs are sorted in increasing order from RB(1) to RB(m), where RB(1) is the available RB having the lowest difference between the corresponding first and second highest priority metrics while RB(m) has the highest corresponding difference. Thereafter, the eNodeB 110 partitions the sorted available RBs based on a threshold N, which may be determined based on experiments and/or empirical studies. In one example embodiment, the value of N is between 1 and "m" and may be an adjustable parameter determined based on experiments and/or empirical studies. For example, if the eNodeB 110 supports 10 schedulable UEs, N may be set to 5.

At S520, for the first N of the sorted available RBs (i.e., for the available RBs in the first group), the eNodeB 110 determines or pates) a new priority metric for each available UE(i) and each RB in the first group, in a similar manner as described above with reference to S416 of FIG. 4.

Thereafter, at S522, the eNodeB 110 assigns each of the first N RBs to one of the UE(i)s having the highest corresponding new priority metric for each of the first N RBs.

At S527, the eNodeB 110 performs the process of S446 described above with reference to FIG. 4 for the each available UE(i) and each RB in the first group. Accordingly and for sake of brevity, S527 will not be further described.

At S532 and S537, the eNodeB repeats the processes of S416 and S421, as described above with reference to FIG. 4, for the remaining number of available RBs (available RBs in the second group). Each of the remaining available RBs may hereinafter be referred to as $RB_r(q)$, where q=N+1, . . . m. Accordingly, and for sake of brevity, S532 and S537 will not be further described.

At S542, the eNodeB 110 assigns each $RB_r(q)$ to the corresponding UE(i) having the highest existing priority metric (e.g., determined previously during a previous scheduling of the $RB_r(q)$). In other words, for each RB in the second group, the eNodeB 110 reuses the existing schedule for assigning a UE(i) to each $RB_r(q)$ without having to re-compute new priority metrics for available UE(i)s and each $RB_r(q)$.

Thereafter, at S547, the eNodeB 110 updates the first and second highest priority metrics for each of the $RB_r(q)$s in a similar manner as described above with reference to S446. Accordingly and for sake of brevity, S547 will not be further described.

Thereafter, at S552, the process reverts back to S315 of FIG. 3.

The example embodiment described above with reference to FIG. 5 enable the eNodeB 110 to reuse previous schedules for some of the available RBs (available RBs in the second group) while the eNodeB 110 computes new priority metrics for other ones of the available RBs (each available RB in the first group). In one example embodiment, the eNodeB 110 computes new priority metrics for each of the first N RBs in the first group because the first N of the RBs represent RBs for which a relatively large change in the UE having the highest priority metric is most likely among the available RBs. However, since similar likelihood of change in the UE having the highest priority metric is least likely in the remaining $RB_r(q)$s in the second group, the eNodeB 110 reuses a prior schedule for each of the $RB_r(q)$s from the previous subframe.

The efficiency achieved by using the process of FIG. 5 may be expressed numerically. In the numerical example of setting the value of N to 5 (half of the 10 schedulable UEs served by the eNodeB 110), the process of FIG. 5, allows reducing the scheduling cost by half and instead supporting a total of 20 schedulable UEs instead of 10).

Variations of the example embodiments are not to be regarded as a departure from the spirit and scope of the example embodiments, and all such variations as would be apparent to one skilled in the art are intended to be included within the scope of this disclosure.

What is claimed:

1. A network control node comprising:
a memory having computer-readable instruction stored therein; and
a processor configured to execute the computer-readable instructions to cause the network control node to,
identify a plurality of schedulable user equipment (UEs), each of the plurality of schedulable UEs having a corresponding priority value,
determine a first expected change in the corresponding priority value of a first UE having a highest corresponding priority value, and determine a second expected change in the corresponding priority value of a second UE having a next highest corresponding priority value, among the plurality of schedulable UEs,
update the corresponding priority values of the first UE and the second UE based on the first expected change and the second expected change, respectively,
compare the undated priority values of the first UE and the second UE,
determine whether to compute a new priority value for each of the plurality of schedulable UEs, or whether to reuse the corresponding priority value for each of the plurality of schedulable UEs, based on the comparing,
in response to the updated priority value of the second UE being less than the updated priority value of the first UE,
determine to reuse the corresponding priority value for each of the plurality of schedulable UEs,
assign at least one resource block to the first UE having the highest corresponding priority value, and
inform the first UE of the assigned at least one resource block, to be used for data transmission, and
in response to the updated priority value of the second UE being equal to or greater than the updated priority value of the first UE,
determine to compute the new priority value for each of the plurality of schedulable UEs,
assign at least one resource block to a UE having a highest new priority value among the plurality of schedulable UEs, and
inform the UE having the highest new priority value of the assigned at least one resource block, to be used for data transmission.

2. The network control node of claim 1, wherein determining to reuse the corresponding priority value for each of the plurality of schedulable UEs comprises determining not to compute the new priority value for each of the plurality of schedulable UEs.

3. The network control node of claim 1, wherein upon determining to compute the new priority value for each of the plurality of schedulable UEs, the processor is configured to execute the computer-readable instructions to cause the network control node to compute the new priority value for each of the plurality of schedulable UEs.

4. The network control node of claim 3, wherein the processor is configured to execute the computer-readable instructions to cause the network control node to,
update a designation of the first UE to correspond to the UE having the highest new priority value, and
store the new priority value for each of the plurality of schedulable UE in the memory.

5. A method comprising:
identifying a plurality of schedulable user equipment (UEs), each of the plurality of schedulable UEs having a corresponding priority value;
determining a first expected change in the corresponding priority value of a first UE having a highest corresponding priority value, and determine a second expected chance in the corresponding priority value of a second UE having a next highest corresponding priority value, among the plurality of schedulable UEs;
updating the corresponding priority values of the first UE and the second UE based on the first expected change and the second expected change, respectively;

comparing the updated priority values of the first UE and the second UE;
determining whether to compute a new priority value for each of the plurality of schedulable UEs, or whether to reuse the corresponding priority value for each of the plurality of schedulable UEs, based on the comparing;
in response to the updated priority value of the second UE being less than the updated priority value of the first UE,
  determining to reuse the corresponding priority value for each of the plurality of schedulable UEs,
  assigning at least one resource block to the first UE having the highest corresponding priority value, and
  informing the first UE of the at least one assigned resource block, to be used for data transmission; and
in response to the updated priority value of the second UE being equal to or greater than the updated priority value of the first UE,
  determining to compute the new priority value for each of the plurality of schedulable UEs,
  assigning at least one resource block to a UE having a highest new priority value among the plurality of schedulable UEs, and
  informing the UE having the highest new priority value of the assigned at least one resource block, to be used for data transmission.

6. The method of claim 5, wherein determining to reuse the corresponding priority value for each of the plurality of schedulable UEs comprises determining not to compute the new priority value for each of the plurality of schedulable UEs.

7. The method of claim 5, wherein upon determining to compute the new priority value for each of the plurality of schedulable UEs, the method further comprises computing the new priority value for each of the plurality of schedulable UE.

8. The method of claim 7, further comprising:
updating a designation of the first UE to correspond to the UE having the highest new priority value; and
storing the new priority value for each of the plurality of schedulable UEs in a memory.

9. A network control node comprising:
a memory having computer-readable instructions stored therein; and
a processor configured to execute the computer-readable instructions to cause the network control node to,
  identify a plurality of schedulable user equipment (UEs), each of the plurality of schedulable UEs having a corresponding priority value,
  identify a plurality of resource blocks that are available to be assigned to one of the plurality of schedulable UEs, and for each of the plurality of resource blocks,
    determine a first UE having a highest corresponding priority value, and determine a second UE having a next highest corresponding priority value, among the plurality of schedulable UEs, and
    determine a difference between the highest corresponding priority value and the next highest corresponding priority value,
  sort the plurality of resource blocks in an increasing order based on the determined difference,
  partition the sorted plurality of resource blocks into a first group of resource blocks and a second group of resource blocks based on a threshold,
  determine whether to compute a new priority value for each of the plurality of schedulable UEs, or whether to reuse the corresponding priority value for each of the plurality of schedulable UEs, based on the partitioning, including
    determining to compute a new priority value for each of the plurality of schedulable UEs in association with the first group of resource blocks, and
    determining to reuse the corresponding priority value for each of the plurality of schedulable UEs in association with the second group of resource blocks,
  for each resource block in the first group, compute the new priority value for each of the plurality of schedulable UEs, and assign the resource block to a UE having a highest new priority value among the plurality of schedulable UEs, and
  for each resource block in the second group, assign the resource block to the first UE having the highest corresponding priority value among the plurality of schedulable UEs.

10. A method comprising:
identifying a plurality of schedulable user equipment (UEs), each of the plurality of schedulable UEs having a corresponding priority value;
identifying a plurality of resource blocks that are available to be assigned to one of the plurality of schedulable UEs, and for each of the plurality of resource blocks;
  determining a first UE having a highest corresponding priority value, and determining a second UE having a next highest corresponding priority value, among the plurality of schedulable UEs, and
  determining a difference between the highest corresponding priority value and the next highest corresponding priority value;
sorting the plurality of resource blocks in an increasing order based on the determined difference;
partitioning the sorted plurality of resource blocks into a first group of resource blocks and a second group of resource blocks based on a threshold;
determining whether to compute a new priority value for each of the plurality of schedulable UEs, or whether to reuse the corresponding priority value for each of the plurality of schedulable UEs, based on the partitioning, including
  determining to compute a new priority value for each of the plurality of schedulable UEs in association with the first group of resource blocks, and
  determining to reuse the corresponding priority value for each of the plurality of schedulable UEs in association with the second group of resource blocks,
for each resource block in the first group, computing the new priority value for each of the plurality of schedulable UEs, and assigning the resource block to a UE having a highest new priority value among the plurality of schedulable UEs; and
for each resource block in the second group, assigning the resource block to the first UE having the highest corresponding priority value among the plurality of schedulable UEs.

* * * * *